Sept. 16, 1969 J. P. BARLOW ET AL 3,467,948

APPARATUS PROVIDING A UNIQUE DECISION SIGNAL FOR CONCURRENT INTERROGATION SIGNALS

Filed June 21, 1966 3 Sheets-Sheet 1

INVENTORS
J. P. BARLOW
C. R. JONES
J. L. KERR
BY

ATTORNEY 3,467,948

APPARATUS PROVIDING A UNIQUE DECISION SIGNAL FOR CONCURRENT INTERROGATION SIGNALS

Jesse P. Barlow, Reseda, Calif., and Charles R. Jones and James L. Kerr, Phoenix, Ariz., assignors to General Electric Company, a corporation of New York
Filed June 21, 1966, Ser. No. 559,305
Int. Cl. G06f 7/00, 15/00
U.S. Cl. 340—172.5 11 Claims

ABSTRACT OF THE DISCLOSURE

Apparatus is disclosed which utilizes a plurality of tristate devices. A requirement of these devices is that, in response to two input signals concurrently applied, each operates in a state in which it produces no output signals. The tristate devices are interconnected to produce a unique decision or output signal in response to the application of any combination of a plurality of interrogation or request input signals applied to the apparatus.

This invention relates to decision-making apparatus and more particularly to apparatus for guaranteeing a unique decision signal in response to a plurality of randomly arriving interrogation signals.

The selection of one, and only one, of a plurality of signals is a common requirement in binary digital data processing systems. In the binary digital data processing system, several different events may require the selection of one of a plurality of randomly generated request signals. For example, any one of a plurality of data processors may, at any time, require the use of a single data transmission link to communicate with the data storage system. Each data processor delivers a request signal when the transmission link is required. Apparatus must be provided to select only one of the request signals and thereby assign the transmission link for use of the corresponding data processor. Another example is described in the copending U.S. patent application Ser. No. 508,168 of J. P. Barlow et al. for Apparatus Providing Symbolic Addressing in a Multicomputer System, filed Nov. 16, 1965, and assigned to the assignee of the instant invention, wherein any one of a plurality of processors may, at any time, require the use of a central address translator to translate a symbolic address into an actual address in the data storage system. Each processor delivers a request signal and a symbolic address when the processor requires communication with the data storage system. Apparatus must be provided to select only one of the request signals and thereby assign the central address translator for translation of the symbolic address provided by the corresponding processor.

The request signals from which selection must be made are binary signals. A binary signal is a signal having either one of two possible values, one value representing the numeral 1 and the other value the numeral 0. To identify the one of a plurality of binary signals selected, a corresponding decision binary signal is employed. Accordingly, the decision-making apparatus which selects one of a plurality of request binary signals delivers a plurality of decision binary signals, each decision signal representing a corresponding request signal. The decision signal corresponding to the request signal selected has one binary value and the remaining decision signals have the other binary value. For example, although each request binary signal may become a binary 1 to represent a current request, only the decision signal corresponding to the recognized request becomes a binary 1 and all of the other decision signals remain binary 0's.

The decision-making apparatus must continuously sense all input interrogation signals, select one, and only one, of those input signals representing current requests, and deliver an output decision signal identifying the recognized request. Once the decision-making apparatus has made its selection, it must continue delivering the corresponding decision signal until the request has been satisfied and the recognized request terminated. Therefore, the decision-making apparatus must inhibit subsequent requests from influencing a decision, once the decision has been made.

The decision-making apparatus also must respond as rapidly as possible to request signals and deliver corresponding decision signals. However, in a data processing system permitting randomly generated requests, two or more current requests may be initiated substantially simultaneously. Therefore, the prior art decision-making devices initially respond immediately to all simultaneously received request signals and then employ one of the first generated decision signals to suppress the other decision signals. Accordingly, these prior art devices resort to complex, costly, and dilatory techniques for providing but one useful decision signal when two or more requests are made simultaneously. For example, in one form of prior art device a choice is immediately made if two or more decision signals are generated, and the non-chosen decision signals are then suppressed. However, the portion of the data processing system which is directly responsive to the decision signals must be rendered non-responsive to momentary delivery of plural decision signals, such as by the employment of time-duration responsive networks for ignoring these momentary signals.

Thus, the prior art decision-making devices for selecting one, and only one, of a plurality of randomly arriving interrogation signals require complex and costly circuits to resolve the problem of simultaneously arriving requests, these complex and costly circuits, in turn adding the additional penalty of delayed response times.

Therefore, it is the principal object of this invention to provide improved decision-making apparatus.

Another object of the invention is to provide decision-making apparatus which is less costly, less complex, more reliable, and faster acting than the prior art decision-making devices.

Another object of this invention is to provide improved apparatus for selecting one, and only one, of a plurality of randomly arriving interrogation signals.

Another object of this invention is to provide decision-making apparatus for providing one, and only one, output decision signal in response to a plurality of simultaneously received interrogation signals.

The foregoing objects are achieved, in accordance with one embodiment of the instant invention, by providing a decision-making apparatus comprising a tristate device coupled to receive a pair of interrogation signals, the tristate device being adapted to deliver a pair of output decision signals in one of three combinational states, wherein the device can at no time deliver two decision signals. The tristate device is adapted always to operate in one of three states, in the first state one of a pair of output decision signals is delivered, in the second state the other one of the pair of decision signals is delivered, and in the third state no decision signal is delivered. The tristate device is prevented internally from at any time delivering, even momentarily, both decision signals. In response to one interrogation input signal the tristate device operates in the first state, in response to the other interrogation signal the device operates in the second state, and in response to no interrogation signals the device operates in the third state. However, if both interrogation signals are received at the same time, the tristate device remains in either the first or second state, if it was previously operating in one of these two states, or transfers randomly to one of the first or second states if it was operating in the third state.

Where selection among more than two interrogation signals is required, another embodiment of the instant invention provides a decision-making apparatus comprising an output tristate device for each pair of interrogation signals, each output device being adapted to deliver one of two decision signals for the corresponding interrogation signals. This embodiment also provides additional tristate devices for responding to pairs of selected groups of the interrogation signals. These additional tristate devices inhibit all but one of the output tristate devices from responding to their respective pairs of interrogation signals received, forcing the inhibited devices to operate in the third state. Accordingly, only one of the output tristate devices is enabled to deliver a decision signal and this one device delivers no more than one decision signal, the decision signal delivered thereby representing one of the interrogation signals received by the decision-making apparatus.

The invention will be described with reference to the accompanying drawings, wherein.

Figure 1:
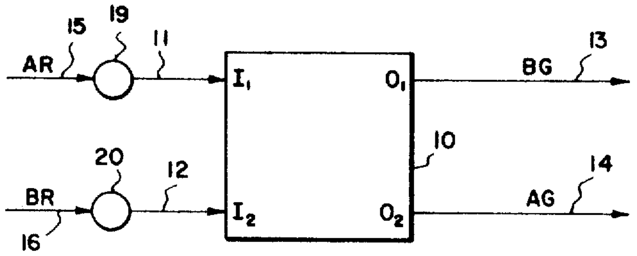
FIGURE 1 is a block diagram of one embodiment of the instant invention.

The decision-making apparatus of FIG. 1 is adapted to continuously sense a pair of interrogation signals, to select one, and only one, of the interrogation signals if one or both of the interrogation signals represent current requests, and to deliver a decision signal identifying the recognized interrogation signal. Although the apparatus of FIG. 1 is shown for operation in a data processing system supplying only two interrogation signals, the apparatus illustrated may comprise a modular portion of a more complex decision-making apparatus for use in data processing systems requiring selection among three or more interrogation signals.

The decision-making apparatus comprises a tristate device 10 having a pair of input leads 11 and 12 and a pair of output leads 13 and 14. Input lead 11 is designated as lead $I_1$, and input lead 12 is designated as lead $I_2$ in the drawings. Additionally, output leads 13 and 14 are designated respectively as leads $0_1$ and $0_2$. The tristate device 10 receives a pair of input signals on leads 11 and 12 and delivers a pair of output signals on leads 13 and 14. Each of these input and output signals is a binary signal, representing either the number 0 or the number 1. For employment with one form of circuit comprising tristate device 10, the binary 1 is represented by a signal having a level of approximately +3 volts, and the binary 0 by a signal having a level of approximately 0 volts.

The apparatus of FIG. 1 receives a pair of interrogation binary signals on leads 15 and 16. The interrogation signal received on lead 15 is arbitrarily designated as the AR signal for clarity in the instant description. Correspondingly, the interrogation signal received on lead 16 is designated as the BR signal. Whenever one of the AR and BR signals has a voltage level corresponding to a binary 1, a respective current request for recognition is denoted. If either an AR or BR signal corresponds to a binary 0 no respective current request is being made by the signal.

The output signals delivered on the $0_1$ and $0_2$ output leads are designated respectively as the BG and AG decision signals. The AG signal representing a binary 1 denotes that the request represented by the AR signal has been granted. The BG signal representing a binary 1 denotes that the request represented by the BR signal has been granted.

Tristate device 10 operates in one of three different states. In the first of these states, denoted as state-1, the BG signal represents a binary 1 and the AG signal represents a binary 0. In the second of these states, denoted as state-2, the BG signal represents a binary 0 and the AG signal represents a binary 1. In the third of these states, denoted as state-3, both of the AG and BG signals represent binary 0's. Accordingly, state-1 represents the granting of the request of the BR interrogation signal, state-2 represents the granting of the request of the AR interrogation signal, and state-3 represents that no request is granted. In the embodiment of FIG. 1 either the AG or BG signal is a binary 1 if the AR signal, the BR signal, or both interrogation signals, represent current requests. Tristate device 10 can at no time deliver simultaneously both the AG and BG signals as binary 1's.

The current state of operation of tristate device 10 is determined by the levels of the signals being received on the $I_1$ and $I_2$ input leads and the preceding history of operation of the device. When the signal on input lead 11 represents a binary 1 and the signal on lead 12 represents a binary 0, device 10 operates in state-1. When the signal on lead 11 represents a binary 0 and the signal on lead 12 represents a binary 1, device 10 operates in state-2. When the signals on both of leads 11 and 12 represents binary 1's, device 10 operates in state-3. However, when the input signals on both of leads 11 and 12 represent binary 0's, the state of operation of device 10 depends on the state of the operation of the device immediately prior to the moment that these two input signals become binary 0's. If device 10 is operating in state-1 at the moment the two input signals on leads 11 and 12 become binary 0's, device 10 continues operating in state-1. If device 10 is operating in state-2 at the moment the two input signals become binary 0's, the device continues operating in state-2. However, if device 10 is operating in state-3 at the moment the two input signals become binary 0's, device 10 will enter into one of the states-1 or 2 in an arbitrarily decisive, or random, manner.

The modes of operation of tristate device 10 in response to its immediate input signals has been described in the above paragraphs. The operation of the entire decision-making apparatus of FIG. 1, in selecting one of two interrogation signals, will now be described.

The interrogation signals received on leads 15 and 16 are applied to respective inverters 19 and 20. The output signal delivered by inverter 19 is transmitted on lead 11, as the $I_1$ input signal, to tristate device 10. The output signal delivered by inverter 20 is transmitted on lead 12, as the $I_2$ input signal, to device 10.

An inverter provides the logical operation of Negation or NOT for an input signal supplied thereto. The output signal delivered by an inverter has a binary significance inverse to the binary significance of the input signal. Thus, the inverter delivers a relatively positive output signal, representing a binary 1, when the input signal supplied thereto is relatively negative, representing a binary 0. The inverter delivers a relatively negative output signal, representing a binary 0, when the input signal supplied thereto is relatively positive, representing a binary 1. In the embodiment described, the inverter delivers a +3 v. output signal when it receives a 0 v. input signal and delivers a 0 v. output signal when it receives a +3 v. input signal.

The logical operation of Negation is represented by employing a bar superscribed with the signal designation. The input signal received by inverter 19 is designated as the AR signal. Therefore, the output signal of this inverter is designated as the $\overline{AR}$ signal, such designation signifying an inverse logical significance relative to the input AR signal. Accordingly, when the AR signal represents a binary 1, the $\overline{AR}$ signal represents a binary 0, and vice versa. It is to be understood herein that whenever a particular signal is generated, the logical inverse signal may be obtained by applying the generated signal to an inverter.

The direct input signals received by tristate device 10 represents the logical inverse of the interrogation signals supplied by the decision-making apparatus of FIG. 1. Thus, device 10 receives the $\overline{AR}$ signal on input lead 11 and the $\overline{BR}$ signal on input lead 12. The following Table I summarizes the operation of the decision-making apparatus of FIG. 1, wherein the $I_1$ and $I_2$ input signals of device 10 represent respectively the $\overline{AR}$ and $\overline{BR}$ signals.

TABLE I

| | Request Signals | | Granting Signals | | Tristate Device State |
|---|---|---|---|---|---|
| | AR | BR | AG | BG | |
| Request group number: | | | | | |
| 0 | 0 | 0 | 0 | 0 | 3 |
| 1 | 0 | 1 | 0 | 1 | 1 |
| 2 | 1 | 0 | 1 | 0 | 2 |
| 3 | 1 | 1 | INDET | | 1 or 2 |

Table I represents the operation of the circuit of FIG. 1 in response to the presentation of two interrogations (request) signals having the different combinational binary state shown. The four possible combinational states of the two request signals have been designated as group numbers 0–3. For example, the presentation of the AR signal and the BR signal as binary 0's is designated as group number 0.

The state of operation of the decision-making apparatus for group numbers 0, 1, and 2 is controlled solely by the combinational state of the two request signals. For example, when both request signals represent binary 0's (group 0) tristate device 10 receives binary 1 input signals of both of input leads 11 and 12. Device 10 is thereby controlled to operate in state-3, delivering a pair of binary 0 output signals. Thus, when neither the AR signal nor the BR signal represents a current request, the AG decision signal and the BG decision signal each represents a binary 0 and the two decision signals jointly represent the granting of no request.

When the AR signal represents a binary 0 and the BR signal represents a binary 1 (group 1), device 10 receives a binary 1 signal on lead 11 and a binary 0 signal on lead 12. Device 12 is thereby controlled to operate in state-1, delivering a binary 1 signal on lead 13 and a binary 0 signal on lead 14. Thus, when the BR signal represents the sole current request, the BG decision signal is a binary 1 and represents the granting of the request indicated by the BR signal.

When the AR signal represents a binary 1 and the BR signal represents a binary 0 (group 2), device 10 receives a binary 0 signal on lead 11 and a binary 1 signal on lead 12. Device 10 is thereby controlled to operate in state-2, delivering a binary 0 signal on lead 13 and a binary 1 signal on lead 14. Thus, when the AR signal represents the sole current request, the AG decision signal is a binary 1 and represents granting of the request indicated by the AR signal.

The state of operation of the decision-making apparatus following receipt of request group 3 is determined by the immediately preceding state of operation of device 10. Accordingly, when both request signals represent binary 1's (group 3), device 10 receives binary 0 input signals on both of input leads 11 and 12. If device 10 has been operating in state-1 immediately prior to the receipt of the pair of binary 0 input signals, device 10 continues operating in state-1. Similarly, if device 10 has been operating in state-2 immediately prior to the receipt of the pair of binary 0 input signals, device 10 continues operating in state-2. However, if device 10 has been operating in state-3 immediately prior to the receipt of the pair of binary 0 input signals, device 10 continues momentarily in unstable operation in state-3, and then immediately transfers at random to either state-1 or state-2. The abbreviation "INDET" in Table I indicates an indeterminate condition of operation of tristate device 10, a condition wherein the device will assume either state-1 or state-2. Thus, when both of the AR and BR signals represent current requests, either the AG decision signal or the BG decision signal is a binary 1, representing the granting of one of the two requests indicated by the AR and BR signals.

In summary, there has been described above a decision-making apparatus for receiving a pair of interrogation signals and for selecting one, and only one, of the interrogation signals when one or both of the signals represent current requests. If but one of the interrogation signals represents a current request, a decision signal is delivered identifying such interrogation signal as the one recognized. If both of the interrogation signals represent current requests, only one of the interrogation signals is recognized and identified by a corresponding decision signal. Furthermore, once one of the two interrogation signals has been recognized, a subsequent request by the other interrogation signal will not change the state of operation of the decision-making apparatus. Instead, the first-recognized interrogation signal will continue to be recognized until the request represented thereby is withdrawn. This mode of operation may be exemplified by assuming a first presentation of request group 1, wherein only the BR signal denotes a current request, device 10 operating in state-1 and delivering a binary 1 BG signal to represent granting of the request indicated by the BR signal. If, next, while the BR signal continues to represent a request, the AR signal becomes a binary 1 to denote a concurrent request (request group 3), the decision-making apparatus continues to recognize and grant the request represented by the BR signal by continuing operation in state-1. After completing the operation initiated when the BR signal request was granted, the processer supplying this signal will terminate the request by changing the BR signal to a binary 0. At this time request number 2 is represented by the interrogation signal combination, whereupon the decision-making apparatus will recognize the sole remaining request by transferring to state-2.

Figure 2:
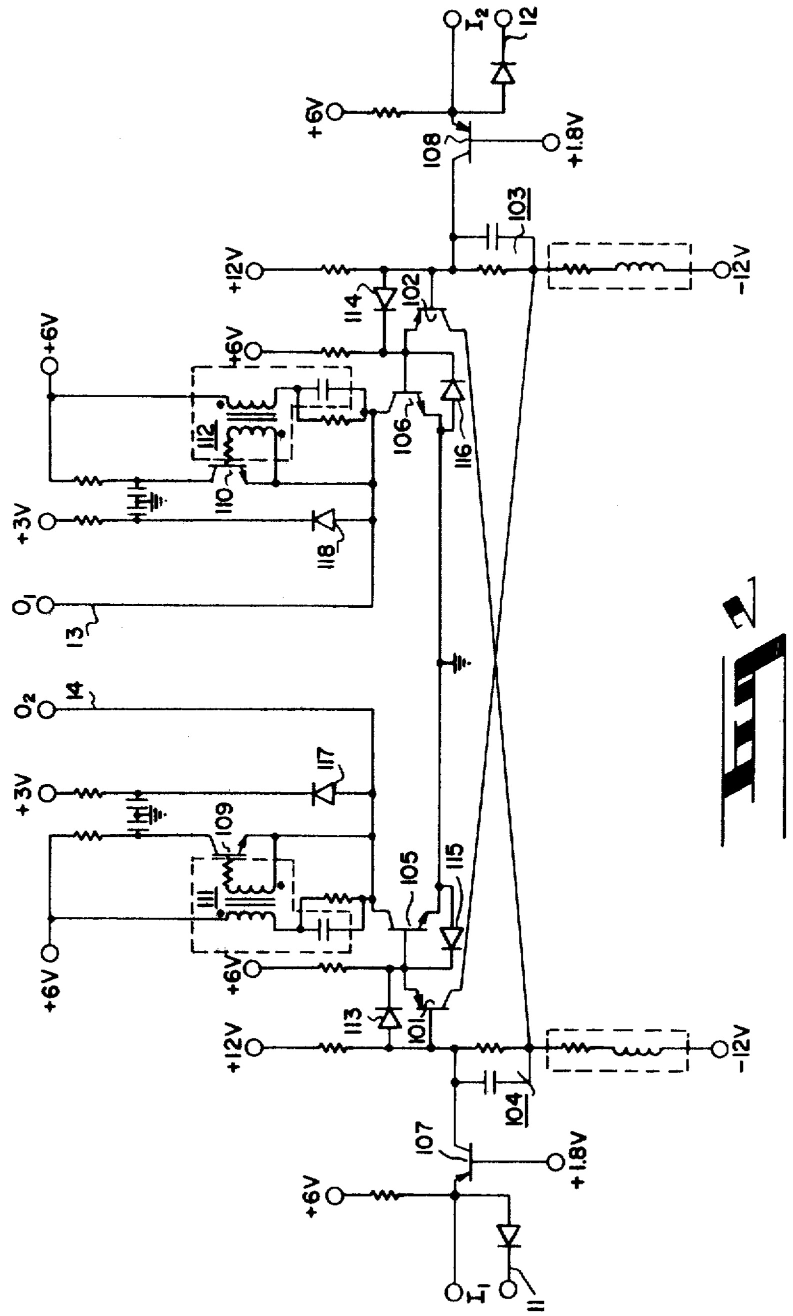
FIGURE 2 is a circuit diagram of one form of tristate device useful in the practice of the invention.

The circuit of one type of tristate device useful in the practice of the instant invention is shown in FIG. 2. The tristate device is similar in operation to the flip-flop. The flip-flop is a device providing temporary storage of a binary digit by operating in either one of two stable states and by transferring from the state in which it is operating to the other stable state upon application of a respective trigger signal thereto. The flip-flop has first and second input leads and first and second output leads. In response to a binary 1 trigger signal on the first input lead, the first output lead delivers a signal representing a binary 1 and the second output lead delivers a signal representing a binary 0. In response to a binary 1 trigger signal on the second input lead, the first output lead delivers a signal representing a binary 0 and the second output lead delivers a signal representing a binary 1. The binary states of the two output signals denote the binary digit that the flip-flop is storing.

The tristate device has the additional capability, not found in many of the flip-flops of the prior art, of providing logically significant output signals when both input signals simultaneously represent binary 1's or when both input signals simultaneously represent binary 0's. The tristate device of FIG. 2 is the invention of N. R. Crain and is the subject of U.S. Patent 3,167,662 issued Jan. 26, 1965 and assigned to the assignee of the instant invention. The output amplifiers shown in FIG. 2 and employed with the tristate device thereof are also the invention of N. R. Crain and are described in U.S. Patent 3,281,704, issued Oct. 25, 1966, and also assigned to the assignee of the instant invention.

The tristate device circuit of FIG. 2 includes a pair of cross-coupled transistor amplifiers comprising the PNP transistors 101 and 102. To effect cross-coupling the collector electrode of transistor 101 is coupled through a resistor-capacitor network 103 to the base electrode of transistor 102 and the collector electrode of transistor 102 is coupled through a resistor-capacitor network 104 to the base electrode of transistor 101. The base electrodes of a pair of NPN transistors 105 and 106 are coupled to the respective emitter electrodes of transistors 101 and 102. Transistors 105 and 106 function as output amplifiers fordriving load circuits, which are connected to the respective $0_1$ and $0_2$ output leads 14 and 13. A pair of input amplifiers comprising the PNP transistors 107 and 108 couple the input signals supplied on respective $I_1$ and $I_2$ input leads 11 and 12 to the base electrodes of respective transistors 101 and 102. A pair of regenerative amplifiers comprising the respective NPN transistors 109 and 110 and the respective transformers 111 and 112 are coupled to the output amplifiers to provide rapid changes of output signal voltages when the state of the tristate device changes.

Input lead 11 receives one inverted interrogation signal, the $\overline{AR}$ signal of FIG. 1, and input lead 12 receives another inverted interrogation signal, the $\overline{BR}$ signal of FIG. 1. Output lead 13 delivers one decision signal, the BG signal of FIG. 1, and output lead 14 delivers the other decision signal, the AG signal of FIG. 1. When any one of the input and output signals represents a binary 1, its level is approximately +3 v. When any one of these signals represents a binary 0, its level is approximately 0 v.

The tristate device is operative in three states. In the first state transistor 101 is non-conductive, transistor 102 is conductive, the output signal on lead 13 represents a binary 1, and the output signal on lead 14 represents a binary 0. In the second state transistor 101 is conductive, transistor 102 is non-conductive, the output signal on lead 13 represents a binary 0, and the ouput signal on lead 14 represents a binary 1. In the third state, both of transistors 101 and 102 are non conductive, and the output signal on each of leads 13 and 14 represents a binary 0.

The three states of the tristate device are provided in response to the four possible combinations of logical input signals, as shown in the following Table II.

TABLE II

| Binary Input Signals | | Binary Output Signals | | |
|---|---|---|---|---|
| $I_1$ | $I_2$ | $0_1$ | $0_2$ | State |
| 1 | 0 | 1 | 0 | 1 |
| 0 | 1 | 0 | 1 | 2 |
| 1 | 1 | 0 | 0 | 3 |
| 0 | 0 | | | |

As shown in Table II, when leads 11 and 12 received respective binary 1 and binary 0 input signals, the device operates in state-1, wherein output lead 13 delivers a binary 1 signal and output lead 14 delivers a binary 0 signal. When leads 11 and 12 receive respective binary 0 and binary 1 input signals, the device operates in state-2, wherein output lead 13 delivers a binary 0 signal and output lead 14 delivers a binary 1 signal. When both of input leads 11 and 12 receive binary 1 input signals, the device operates in state-3, wherein each of output leads 13 and 14 delivers a signal representing a binary 0. However, when both of input leads 11 and 12 receive binary 0 input signals, the state of the device is determined by its immediately preceding history, as shown in the following Table III:

TABLE III

| State Before 0-0 Inputs | | | State After 0-0 Inputs | | |
|---|---|---|---|---|---|
| $0_1$ | $0_2$ | State | $0_1$ | $0_2$ | State |
| 1 | 0 | 1 | 1 | 0 | 1 |
| 0 | 1 | 2 | 0 | 1 | 2 |
| 0 | 0 | 3 | 0 | 1 | 1 or 2 |
| | | | 1 | 0 | |

As shown in Table III, when the tristate device is operating in state-1 and the input signal on lead 11 changes from a binary 1 to a binary 0, the device continues to operate in state-1. When the device is operating in state-2 and the input signal on lead 12 changes from a binary 1 to a binary 0, the device continues to operate in state-2 However, when the device is operating in state-3 and both of the input signals substantially simultaneously change from binary 1's to binary 0's, the device transfers to operation in state-1 or state-2. In this transition, whether the flip-flop assumes operation in state-1 or state-2, depends on the relative values of the corresponding parameters of the circuit, these parameters determining whether transistor 101 or 102 will first regain conduction when both input signals simultaneously change to binary 0's.

In state-1 a +3 v., binary 1 signal is received by input lead 11 and a 0 v., binary 0 signal is received by input lead 12. The +3 v. signal on lead 11 forces transistor 107, diode 113, and the emitter-base junction of transistor 105 to be conductive in series and a voltage of approximately +1.0 v. is accordingly provided at the base of transistor 101. Inasmuch as the voltage on the emitter of transistor 101 is approximately +0.5 v. due to conduction of transistor 105, the emitter-base junction of transistor 101 is reverse-biased. Therefore, transistor 101 is maintained non-conductive by the binary 1 signal on input lead 11.

Additionally, the 0 v. signal on lead 12 forces transistor 108 to be non-conductive, thereby permitting the voltage on the base of transistor 102 to decrease until transistor 102 conducts heavily. With transistor 102 conductive, the voltage on the base thereof is determined by the sum of the voltage across diode 116, through which the emitter current of transistor 102 flows, and the emitter-base voltage of transistor 102. Accordingly, the base voltage of transistor 102 is approximately −1.0 v. When transistor 102 is conductive, the voltage on its emitter is approximately −0.5 v., thereby reverse-biasing the emitter-base junction of transistor 106, and transistor 106 is mantained non-conductive.

Thus, in state-1 the $0_1$ output lead 13 delivers a binary 1 signal and the $0_2$ output lead 14 delivers a binary 0 signal. With transistor 106 non-conductive, the voltage on the collector thereof increases until the collector is clamped at approximately +3 v., by the diode 118. Accordingly, the potential of output lead 13, which is connected to the collector of transistor 106, represents a binary 1. With transistor 105 conductive, the voltage on the collector thereof is approximately +0.2 v. Accordingly, the potential of output lead 14, which is connected to the collector of transistor 105, represents a binary 0.

The opposite modes of conduction of transistors 101 and 102 in state-1 provide a "memory" voltage across the capacitor of resistor-capacitor network 104. The capacitor of network 104 has its upper terminal connected to the base of transistor 101, which is being maintained at a potential level of +1.0 v., and its lower terminal connected to the collector of transistor 102, which is being maintained at a potential level of −0.7 v. Accordingly, the capacitor stores a voltage of approximately 1.7 v. It is this latter voltage which maintains the circuit in state-1 (Table III) when the input signal applied to lead 11 in state-1 drops from +3 v. to 0 v.

In state-2 a 0 v., binary 0 signal is received by input lead 11 and a +3 v., binary 1 signal is received by input lead 12. In this state the conductive condition of each transistor is reversed from its condition in state-1. For example, transistor 102 is maintained non-conductive and transistor 101 conducts heavily. Accordingly, in state-2, the $0_1$ output lead 13 delivers a binary 0 signal and the $0_2$ output lead 14 delivers a binary 1 signal. Additionally, resistor-capacitor network 103 now stores a 1.7 v. "memory" voltage so that the circuit remains in state-2 when the input signal applied to lead 12 drops from +3 v. to 0 v.

In state-3 a +3 v., binary 1 signal is received by both input leads 11 and 12. The +3 v. input signals force transistor 107, diode 113, and the emitter-base junction of transistor 105 to conduct in series and transistor 108, diode 114, and the emitter-base junction of transistor 106 to conduct in series. Therefore, transistors 101 and 102 are each maintained non-conductive. With transistors 105 and 106 conductive, the +0.2 v. potentials on their respective collectors provide binary 0 signals on both output leads 13 and 14.

The maintenance of both transistors 101 and 102 non-conducting in state-3 provides the storage of a large "memory" voltage on the capacitors of resistor-capacitor networks 103 and 104. The upper terminals of these capacitors are maintained at a potential level of +1.0 v., by connection to the anodes of the conducting diodes 113 and 114. The lower terminals of these capacitors are maintained at approximately −9.0 v. by the voltage divider action of the series resistors between the anodes of diodes 113 and 114 and the −12 v. source. Therefore, the capacitors of resistor-capacitor networks 103 and 104 store voltages of approximately 10.0 v. in state-3. These large "memory" voltages momentarily continue transistors 101 and 102 non-conducting if both input signals drop from +3 v. to 0 v. at substantially the same time, so that both output signals momentarily continue to represent binary 0's until one of the capacitors discharges to a voltage that permits the corresponding one of transistors 101 or 102 to begin conduction.

As described above, with relation to Table III, when a 0 v., binary 0 signal is received by both input leads 11 and 12, the state of operation of the tristate device depends on the state of operation immediately prior to the time when both input signals become binary 0's. When each input signal represents a binary 0 neither transistor 107 nor transistor 108 is conductive, the tristate device circuit is isolated from and uncontrolled by the present input signals, and its state is controlled by internal potential levels existing in the immediately preceding state.

If the device previously has been operating in state-1, transistor 101 has been non-conductive, transistor 102 has been conductive, the +3 v. input signal on lead 11 has been forcing conduction of transistor 107, and a "memory" voltage has been stored on the capacitor of resistor-capacitor network 104, the upper terminal of this capacitor being at +1.0 v. Now, if the input signal on lead 11 changes to a binary 0, transistor 107 becomes non-conductive but the capacitor "memory" voltage momentarily continues to maintain the base of transistor 101 at +1.0 v. and maintain transistor 101 non-conductive. Thus, transistor 105 and diode 113 continue to conduct, the base voltage of transistor 101 remains at +1.0 v. and the circuit continues to operate in state-1.

In a similar manner, the device continues to operate in state-2 if the binary 1 input signal applied to lead 12 changes to represent a binary 0.

However, if the device has been operating in state-3, both transistors 101 and 102 have been non-conductive, both +3 v. input signals have been forcing conduction of transistors 107 and 108, and large "memory" voltages have been stored on the capacitors of both resistor-capacitor networks 103 and 104, the upper terminals of each of these capacitors being at +1.0 v. Now, if the input signals on both leads 11 and 12 change to binary 0's, the isolation provided by the consequent non-conductive transistors 107 and 108 leaves the circuit in a temporarily unstable state. The capacitor "memory" voltages momentarily continue to maintain the base of each of transistors 101 and 102 at +1.0 v. and these transistors temporarily remain non-conductive. Each output signal correspondingly continues momentarily to represent a binary 0. Both capacitors immediately commece to discharge and the voltage on the base of each of transistors 101 and 102 becomes more negative. Since absolute identity cannot exist between corresponding components of the tristate device, one of these capacitors will discharge first to a voltage that permits the corresponding one of transistors 101 or 102 to begin conduction. The collector of the one of transistors 101 or 102 which first becomes conductive will immediately rise to a potential level of −0.7 v., forcing a voltage rise of the entire resistor-capacitor network to which such collector is connected and increasing the reverse bias on the remaining non-conducting one of transistors 101 and 102. The circuit will then remain operating in a stable manner in state-1 or state-2, whichever state corresponds to the one of transistors 102 or 101 that first becomes conductive.

Of particular significance in the employment of this tristate circuit in the instant invention is the fact that at no time will more than one of output leads 13 and 14 deliver a binary 1 signal, and in the momentary unstable period described the output lead which first commences to deliver a binary 1 signal continues to do so as the circuit settles into its stable condition.

Where selection among more than two interrogation signals is required, the instant decision-making invention comprises a plurality of tristate devices, of the type described above, for receiving the interrogation signals and for delivering output signals representing a single decision signal. The decision signal delivered represents the granting of the request indicated by one of the interrogation signals. One or more of the tristate devices controls intermediate selection among pairs of groups of the interrogation signals. As the operation of the invention is presently understood, if the number of interrogation signals is represented by N, the total number of tristate devices required is $N-1$. Of these $N-1$ tristate devices, $N/2$ are output tristate devices if an even number of interrogation signals are supplied, whereas $$\left(\frac{N}{2}-1/2\right)$$

are output tristate devices if an odd number of interrogation signals are supplied.

Figure 3:
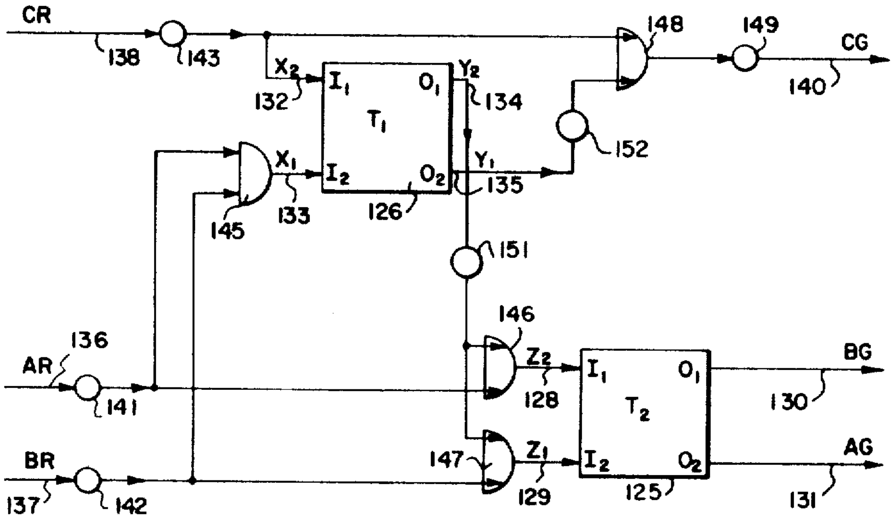
FIGURE 3 is a block diagram of another embodiment of the instant invention.
Figure 4:
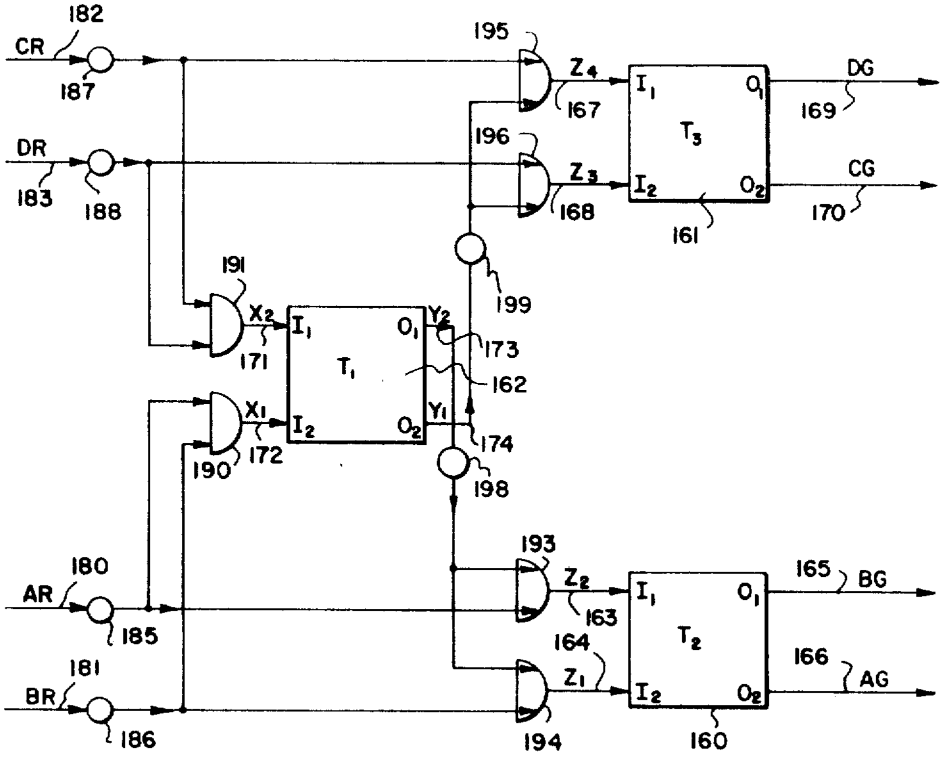
FIGURE 4 is a block diagram of an additional embodiment of the instant invention.

The embodiments of FIGS. 3 and 4 demonstrate the application of the instant invention to the selection among three and four interrogation signals, respectively.

The decision-making apparatus of FIG. 3 is adapted to continuously sense three interrogation signals, to select one, and only one, of the interrogation signals if one or more of the interrogation signals represent current requests, and to deliver a decision signal identifying the recognized interrogation signal. The decision-making apparatus comprises an output tristate device 125 and a control and output tristate device 126, each of these tristate devices having the structure and mode of operation described above. For convenience herein device 125 has been designated as the $T_2$ tristate device and device 126 as the $T_1$ tristate device. Tristate device 125 receives a pair of input signals on leads 128 and 129 and delivers a pair of output signals on leads 130 and 131. Tristate device 126 receives a pair of input signals on leads 132 and 133 and delivers a pair of output signals on leads 134 and 135.

The apparatus of FIG. 3 receives interrogation binary signals on leads 136, 137, and 138. The interrogation signal received on lead 136 is arbitrarily designated as the AR signal for clarity in the instant description. Correspondingly, the interrogation signal received on lead 137 is designated as the BR signal and the interrogation signal received on lead 138 is designated as the CR signal. Whenever one of the AR, BR, or CR signals has a voltage level corresponding to a binary 1, a respective current request for recognition is denoted.

The output signals delivered on the $0_1$ and $0_2$ output leads of device 125 are designated respectively as the BG and AG decision signals. The binary signal delivered on a lead 140 is designated as the CG decision signal. The AG signal becomes a binary 1 to denote that the request represented by the AR signal has been granted, the BG signal becomes a binary 1 to denote that the request represented by the BR signal has been granted, and the CG signal becomes a binary 1 to denote that the request represented by the CR signal has been granted.

The interrogation signals received on leads 136, 137, and 138 are applied to respective inverters 141, 142, and 143. The $\overline{AR}$ output signal delivered by inverter 141 is transmitted to one of the two input leads of an AND-gate 145 and to one of the two input leads of an OR-gate 146. The $\overline{BR}$ output signal delivered by inverted 142 is transmitted to the other input lead of AND-gate 145 and to one of the two input leads of an OR-gate 147. The $\overline{CR}$ output signal delivered by inverter 143 is transmitted to the $I_1$ input lead of the $T_1$ tristate device and to one of the two input leads of an OR-gate 148.

The output signal delivered by AND-gate 145 is applied to the $I_2$ input lead of the $T_1$ device. The output signal delivered by OR-gate 146 is applied to the $I_1$ input lead of the $T_2$ device. The output delivered or OR-gate 147 is applied to the $I_2$ input lead of the $T_2$ device.

The $0_1$ and $0_2$ output signals delivered by the $T_1$ device are applied to respective inverters 151 and 152. The output signal delivered by inverter 152 is applied to the other input lead of OR-gate 148. The output signal delivered by inverter 151 is applied to the other input leads of each of OR-gates 146 and 147. The output signal delivered by OR-gate 148 is applied to an inverter 149, the output signal of inverter 149 being the CG signal delivered on lead 140.

The AND-gate provides the logical operation of conjunction for binary 1 signals applied thereto. In the instant embodiment, since the binary 1 is represented by a relatively positive signal, the AND-gate provides a relatively positive output signal representing a binary 1 when, and only when, all of the input signals applied thereto represent binary 1's. Thus, AND-gate 145 delivers a binary 1 output signal to the $I_2$ input lead of the $T_1$ device when, and only when, both of the $\overline{AR}$ and $\overline{BR}$ signals, which are delivered by respective inverters 141 and 142, represents binary 1's.

The OR-gate provides the logical operation of Inclusive-Or for binary 1 signals applied thereto. Since the binary 1 is represented by a relatively positive signal, the OR-gate provides a relatively positive output signal representing a binary 1 when any one or more of the input signals applied thereto represent binary 1's. Thus, OR-gate 146 delivers a binary 1 output signal to the $I_1$ input lead of the $T_2$ device when any one, or both, of the input signals received by OR-gate 146 represent binary 1's.

For clarity in the ensuing description of operation, the $I_1$ input signal of device 126 has been designated uniquely as the $X_2$ signal and the $I_2$ input signal of this device, which is also the output signal of AND-gate 145, has been designated as the $X_1$ signal. The $0_1$ and $0_2$ output signals of device 126 have ben designated respectively as the $Y_2$ and $Y_1$ signals. The $I_1$ input signal of device 125, which is also the output signal of OR-gate 146, has been designated as the $Z_2$ signal. The $I_2$ input signal of device 125, which is also the output signal of OR-gate 147, has been designated at the $Z_1$ signal. The following Table IV utilizes these unique signal designations in summarizing the operation of the decision-making apparatus of FIG. 3.

TABLE IV

| Request Group Number | Request Signals | | | $T_1$ Inputs | | $T_1$ Outputs | | $T_2$ Inputs | | $T_2$ Outputs | | |
|---|---|---|---|---|---|---|---|---|---|---|---|---|
| | CR | AR | BR | $X_1$ | $X_2$ | $Y_1$ | $Y_2$ | $Z_1$ | $Z_2$ | CG | AG | BG |
| 0 | 0 | 0 | 0 | 1 | 1 | 0 | 0 | 1 | 1 | 0 | 0 | 0 |
| 1 | 0 | 0 | 1 | 0 | 1 | 0 | 1 | 0 | 1 | 0 | 0 | 1 |
| 2 | 0 | 1 | 0 | 0 | 1 | 0 | 1 | 1 | 0 | 0 | 1 | 0 |
| 3 | 0 | 1 | 1 | 0 | 1 | 0 | 1 | 0 | 0 | 0 | INDET | |
| 4 | 1 | 0 | 0 | 1 | 0 | 1 | 0 | 1 | 1 | 1 | 0 | 0 |
| 5 | 1 | 0 | 1 | 0 | 0 | 0 | 1 | 0 | 1 | 0 | 0 | 1 |
| | | | | | | 1 | 0 | 1 | | 1 | 0 | 0 |
| 6 | 1 | 1 | 0 | 0 | 0 | 0 | 1 | 1 | 0 | 0 | 1 | 0 |
| | | | | | | 1 | 0 | | 1 | 1 | 0 | 0 |
| 7 | 1 | 1 | 1 | 0 | 0 | 0 | 1 | 0 | 0 | 0 | INDET | |
| | | | | | | 1 | 0 | 1 | 1 | 1 | 0 | 0 |

Table IV represents the operation of the circuit of FIG. 3 in response to the presentation of the three interrogation (request) signals having the different combinational binary states shown. The eight possible combinational states of the three request signals have been designated as group numbers 0–7. For example, the presentation of the AR, the BR and the CR signals as binary 0's is designated as group number 0.

The state of operation of the decision-making apparatus for group numbers 0, 1, 2 and 4 is controlled solely by the combination state of the three request signals. For example, when all request signals represent binary 0's (group 0), each of OR-gates 146, 147 and 148 receive binary 1 input signals on the respective input leads coupled to the inverters 141, 142 and 143. Therefore, each of these OR-gates delivers a binary 1 output signal. The $T_2$ device receives a pair of binary 1 input signals and is thereby controlled to operate in state-3, delivering a pair of binary 0 decision signals. Inverter 149 converts the binary 1 output signal of OR-gate 148 into a binary 0 decision signal. Thus, when none of the AR, BR or CR signals represents a current request, the AG, BG, and CG decision signals each represents a binary 0 and the three decision signals jointly represent the granting of no request.

When the AR signal represents a binary 0, the BR signal represents a binary 1, and the CR signal represents a binary 0 (group 1), OR-gates 146 and 148 receive binary 1 input signals from respective inverters 141 and 143 and delivery binary 1 output signals. The $T_1$ tristate device also receives the binary 1 output signal of inverter 143 as the $X_2$ input signal. AND-gate 145 receives and is disabled by the binary 0 output signal of inverter 142, so that the $X_1$ signal is a binary 0. Accordingly, the $T_1$ device, receiving the binary 1 $X_2$ signal and the binary 0 $X_1$ signal, operates in state-1, wherein the $Y_2$ output signal is a binary 1 and the $Y_1$ output signal is a binary 0. Since OR-gate 147 now receives a pair of binary 0 signals, the $Z_1$ output signal is a binary 0. The $T_2$ device, receiving the binary 1 $Z_2$ signal and the binary 0 $Z_1$ signal, operates in state-1, wherein the BG decision signal is a binary 1 and the AG decision signal is a binary 0. The binary 1 signal delivered by OR-gate 148 is converted into a binary 0 decision signal by inverter 149. Thus, when the BR signal represents the sole current request, the BG decision signal is a binary 1 and represents the granting of the request indicated by the BR signal.

When the AR signal represents a binary 1, the BR signal represents a binary 0, and the CR signal represents a binary 0 (group 2), the decision-making apparatus of FIG. 3 operates similarly to the operation described above for group 1, except that for this request group OR-gate 146 delivers a binary 0 $Z_2$ output signal and OR-gate 147 delivers a binary 1 $Z_1$ output signal. Accordingly, the $T_2$ device operates in state-2, wherein the AG decision signal is a binary 1 and the BG decision signal is a binary 0. Thus, when the AR signal represents the sole current request, the AG decision signal is a binary 1 and represents the granting of the request indicated by the AR signal.

When the AR signal represents a binary 0, the BR signal represents a binary 0, and the CR signal represents a binary 1 (group 4), OR-gates 146 and 147 receive binary 1 input signals from respective inverters 141 and 142 and deliver binary 1 output signals to the $T_2$ device. Accordingly, the $T_2$ device operates in state-3, wherein both the AG and BG decision signals are binary 0's. The $T_1$ device receives the binary 0 output signal of inverter 143 as the $X_2$ signal. AND-gate 145 receives the two binary 1 signals of inverters 141 and 142, so that the $X_1$ signal is a binary 1. Accordingly, the $T_1$ device, receiving the binary 0 $X_2$ signal and the binary 1 $X_1$ signal operates in state-2, wherein the $Y_2$ output signal is a binary 0 and the $Y_1$ output signal is a binary 1. Since OR-gate 148 now receives a pair of binary 0 signals, it delivers a binary 0 output signal. The binary 0 output signal delivered by OR-gate 148 is converted into a binary 1 decision signal by inverter 149. Thus, when the CR signal represents the sole current request, the CG decision signal is a binary 1 and represents the granting of the request indicated by the CR signal.

The state of operation of the decision-making apparatus for group numbers 3, 5, 6 and 7 is controlled partially by the combinational state of the request signals and partially by the immediately preceding state of operation of the decision-making apparatus. When the AR signal represents a binary 1, the BR signal represents a binary 1, and the CR signal represents a binary 0 (group 3), only OR-gate 148 receives a binary 1 input signal from inverters 141, 142, and 143, this signal being received from inverter 143. Inverter 149 converts the resultant binary 1 signal delivered by OR-gate 148 to a binary 0 CG decision signal. The $T_1$ device also receives the binary 1 output signal of inverter 143 as the $X_2$ signal. AND-gate 145 receives and is disabled by the pair of binary 0 output signals of inverters 141 and 142, so that the $X_1$ signal is a binary 0. Accordingly, the $T_1$ device, receiving the binary 1 $X_2$ signal and the binary 0 $X_1$ signal, operates in state-1, wherein the $Y_2$ output signal is a binary 1 and the $Y_1$ output signal is a binary 0. Since both of OR-gates 146 and 147 now receive a pair of binary 0 signals, the respective $Z_2$ and $Z_1$ output signals are binary 0's. The $T_2$ tristate device, upon receiving the pair of binary 0 signals, operates in a state which is determined by its immediately preceding history, as described previously with respect to Table III. Therefore, the $T_2$ device will now operate in either state-1 or state-2, wherein one of the AG or BG decision signals is a binary 1. Thus, when both of the AR and BR signals represent current requests, either the AG decision signal or the BG decision signal is a binary 1, representing the granting of one of the two requests indicated by the AR and BR signals.

When the AR signal represents a binary 0, the BR signal represents a binary 1, and the CR signal represents a binary 1 (group 5), only OR-gate 146 receives a binary 1 input signal from inverters 141, 142, and 143, this signal being received from inverter 141. The $T_1$ device receives the binary 0 output signal of inverter 143 as the $X_2$ signal. AND-gate 145 receives and is disabled by the binary 0 output signal of inverter 142, so that the $X_1$ signal is a binary 0. The $T_1$ device, upon receiving the pair of binary 0 signals, operates in a state which is determined by its immediately preceding history. For example, if the $T_1$ device has previously been operating in state-2, such as by receipt of a request group 1 by the decision-making apparatus, the $T_1$ device now continues operating in this state-2. Therefore, the $T_1$ device operates in state-1 or state-2, wherein one of the $Y_2$ or $Y_1$ output signals is a binary 1.

In state-1, the $T_1$ device enables the recognition of the BR request signal, whereas in state-2, the $T_1$ device enables the recognition of the CR signal. Thus, when the $T_1$ device operates in state-1, the binary 1 output signal of inverter 152 controls OR-gate 148 to deliver a binary 1 output signal. The binary 1 signal delivered by OR-gate 148 is converted into a binary 0 CG decision signal by inverter 149. Since the output signal of inverter 151 is a binary 0, OR-gate 147 now receives a pair of binary 0 signals and the $Z_1$ signal is a binary 0. The $T_2$ device, receiving the binary 1 $Z_2$ signal from OR-gate 146 and the binary 0 $Z_1$ signal, operates in state-1, wherein the BG decision signal is a binary 1 and the AG decision signal is a binary 0. On the other hand, if the $T_1$ device operates in state-2, the $Y_2$ output signal is a binary 0 and the $Y_1$ output signal is a binary 1. OR-gates 146 and 147 each respond to the binary 1 output signal of inverter 151 to deliver corresponding binary 1 $Z_2$ and $Z_1$ signals Accordingly, the $T_2$ device operates in state-3, wherein both the AG and BG decision signals are binary 0's. OR-gate 148 now receives a pair of binary 0 signals and delivers a binary 0 output signal to inverter 149. Inverter 149 converts the binary 0 signal received into a binary 1 CG decision signal. Thus, when both of the BR and CR signals represent current requests, either the BG decision signal or the CG decision signal is a binary 1, representing the granting of one of the two requests indicated by the BR and CR signals.

When the AR signal represents a binary 1, the BR signal represents a binary 0, and the CR signal represents a binary 1 (group 6), the decision-making apparatus of FIG. 3 operates similarly to the operation described above for group 5, except that for this group 6 OR-gate 147 continuously delivers a binary 1 $Z_1$ signal. Thus, when the $T_1$ device operates in state-1, the $T_2$ device, receiving the binary 0 $Z_2$ signal and the binary 1 $Z_1$ signal, operates in state-2, wherein the AG decision signal is a binary 1 and the BG decision signal is a binary 0. Again, if the $T_1$ device operates in state-2, the CG decision signal is a binary 1. Thus, when both of the AR and CR signals represent current requests, either the AG decision signal or the CG decision signal is a binary 1, representing the granting of one of the two requests indicated by the AR and CR signals.

When each of the three request signals represents a binary 1 (group 7), each of inverters 141, 142 and 143 delivers a binary 0 output signal. The $T_1$ device receives the binary 0 output signal of inverter 143 as the $X_2$ signal. AND-gate 145 receives and is disabled by the pair of binary 0 output signals of inverters 141 and 142, so that the $X_1$ signal is a binary 0. The $T_1$ device, upon receiving the pair of binary 0 signals, operates in a state which is determined by its immediately preceding history. Therefore, the $T_1$ device operates in state-1 or state-2, wherein one of the $Y_2$ or $Y_1$ output signals is a binary 1. In state-1, the binary 1 output signal of inverter 152 controls OR-gate 148 to deliver a binary 1 output signal, this signal being converted by inverter 149 to a binary 0 CG decision signal. Since the output signal of inverter 151 is a binary 0, each of OR-gates 146 and 147 now receive a pair of binary 0 signals, and the respective $Z_1$ and $Z_2$ signals are binary 0's. The $T_2$ device, upon receiving the pair of binary 0 signals, also operates in a state which is determined by its immediately preceding history. Therefore, if the $T_1$ device is operating in state-1, the $T_2$ device will operate in either state-1 or state-2, wherein one of the AG or BG decision signals is a binary 1. However, if the $T_1$ device is operating in state-2, the binary 1 output signal of inverter 151 controls each of OR-gates 146 and 147 to deliver corresponding binary 1 signals. Accordingly, the $T_2$ device operates in state-3, wherein both the AG and BG decision signals are binary 0's. OR-gate 148 now receives a pair of binary 0 signals and delivers a binary 0 output signal, this signal being converted by inverter 149 to a binary 1 CG decision signal. Thus, when all of the AR, BR, and CR signals represent current requests, only one of the AG, BG or CG decision signals is a binary 1, representing the granting of one of the three requests indicated by the AR, BR and CR signals.

The decision-making apparatus of FIG. 4 is adapted to continuously sense four interrogation signals, to select one, and only one, of the interrogation signals if more than one of the interrogation signals represent current requests, and to deliver a decision signal identifying the recognized interrogation signal. The decision-making apparatus comprises a pair of output tristate devices 160 and 161 and a control tristate device 162, each of these tristate devices having the structure and mode of operation described above. Devices 160, 161 and 162 have been designated respectively as the $T_2$, $T_3$ and $T_1$ tristate devices. Tristate device 160 receives a pair of input signals on leads 163 and 164 and delivers a pair of output signals on leads 165 and 166. Tristate device 161 receives a pair of input signals on leads 167 and 168 and delivers a pair of output signals on leads 169 and 170. Tristate device 162 receives a pair of input signals on leads 171 and 172 and delivers a pair of output signals on leads 173 and 174.

The apparatus of FIG. 4 receives interrogation binary signals on leads 180, 181, 182, and 183. The interrogation signal received on lead 180 is arbitrarily designated as the AR signal for clarity in the instant description. Correspondingly, the interrogation signal received on lead 181 is designated as the BR signal, the interrogation signal received on lead 182 is designated as the CR signal, and the interrogation signal received on lead 183 is designated as the DR signal. Whenever one of the AR, BR, CR or DR signals has a voltage level corresponding to a binary 1, a respective current request for recognition is denoted.

The output signals delivered on the $0_1$ and $0_2$ output leads of device 160 are designated respectively as the BG and AG decision signals. The output signals delivered on the $0_1$ and $0_2$ output leads of device 161 are designated respectively as the DG and CG decision signals. Each of the AG, BG, CG, and DG signals become a binary 1 to denote that the request represented by the respective AR, BR, CR or DR signals has been granted.

The interrogation signals received on leads 180–183 are applied to respective inverters 185, 186, 187 and 188. The $\overline{AR}$ output signal delivered by inverter 185 is transmitted to one of the two input leads of an AND-gate 190 and to one of the two input leads of an OR-gate 193. The $\overline{BR}$ output signal delivered by inverter 186 is transmitted to the other input lead of AND-gate 190 and to one of the two input leads of an OR-gate 194. The $\overline{CR}$ output signal delivered by inverter 187 is transmitted to one of the two input leads of an AND-gate 191 and to one of the two input leads of an OR-gate 195. The $\overline{DR}$ output signal delivered by inverter 188 is transmitted to the other input lead of AND-gate 191 and to one of the two input leads of an OR-gate 196.

The output signals delivered by AND-gates 190 and 191 are applied to tthe respective $I_2$ and $I_1$ input leads of the $T_1$ device. The output signals delivered by OR-gates 193 and 194 are applied to the respective $I_1$ and $I_2$ input leads of the $T_2$ device. The output signals delivered by OR-gates 195 and 196 are applied to the respective $I_1$ and $I_2$ input leads of the $T_3$ device.

The $0_1$ and $0_2$ output signals delivered by the $T_1$ device are applied to respective inverters 198 and 199. The output signal delivered by inverter 199 is applied to the other input leads of each of OR-gates 195 and 196. The output signal delivered by inverter 198 is applied to the other input leads of each of OR gates 193 and 194.

For clarity in the ensuing description of operation, the $I_1$ input signal of the $T_1$ device, which is also the output signal of AND-gate 191, has been designated as the $X_2$ signal and the $I_2$ input signal of this device, which is also the output signal of AND-gate 190, has been designated as the $X_1$ signal. The $0_1$ and $0_2$ output signals of the $T_1$ device have been designated respectively as the $Y_2$ and $Y_1$ signals. The $I_1$ input signal of the $T_2$ device, which is also the output signal of OR-gate 193, has been designated as the $Z_2$ signal and the $I_2$ input signal of this device, which is also the output signal of OR-gate 194, has been designated as the $Z_1$ signal. The $I_1$ input signal of the $T_3$ device, which is also the output signal of OR-gate 195, has been designated as the $Z_4$ signal and the $I_2$ input signal of this device, which is also the output signal of OR-gate 196, has been designated as the $Z_3$ signal. The following Table V utilizes these unique signal designations in summarizing the operation of the decision-making apparatus of FIG. 4.

TABLE V

| | Request signals | | | | $T_1$ Inputs | | $T_1$ Outputs | | $T_3$ Inputs | | $T_2$ Inputs | | $T_3$ Outputs | | $T_2$ Outputs | |
|---|---|---|---|---|---|---|---|---|---|---|---|---|---|---|---|---|
| | DR | CR | AR | BR | $X_2$ | $X_1$ | $Y_2$ | $Y_1$ | $Z_4$ | $Z_3$ | $Z_1$ | $Z_2$ | DG | CG | AG | BG |
| Request Group Number: | | | | | | | | | | | | | | | | |
| 0 | 0 | 0 | 0 | 0 | 1 | 1 | 0 | 0 | 1 | 1 | 1 | 1 | 0 | 0 | 0 | 0 |
| 1 | 0 | 0 | 0 | 1 | 1 | 0 | 1 | 0 | 1 | 1 | 0 | 1 | 0 | 0 | 0 | 1 |
| 2 | 0 | 0 | 1 | 0 | 1 | 0 | 1 | 0 | 1 | 1 | 1 | 0 | 0 | 0 | 1 | 0 |
| 3 | 0 | 0 | 1 | 1 | 1 | 0 | 1 | 0 | 1 | 1 | 0 | 0 | 0 | 0 | INDET | |
| 4 | 0 | 1 | 0 | 0 | 0 | 1 | 0 | 1 | 0 | 1 | 1 | 1 | 0 | 1 | 0 | 0 |
| 5 | 0 | 1 | 0 | 1 | 0 | 0 | 0 | 1 | 0 | 1 | 1 | 1 | 0 | 1 | 0 | 0 |
| | | | | | | | 1 | 0 | 1 | | 0 | | 0 | 0 | 0 | 1 |
| 6 | 0 | 1 | 1 | 0 | 0 | 0 | 0 | 1 | 0 | 1 | 1 | 1 | 0 | 1 | 0 | 0 |
| | | | | | | | 1 | 0 | 1 | | | 0 | 0 | 0 | 1 | 0 |
| 7 | 0 | 1 | 1 | 1 | 0 | 0 | 0 | 1 | 0 | 1 | 1 | 1 | 0 | 1 | 0 | 1 |
| | | | | | | | 1 | 0 | 1 | | 0 | 0 | 0 | 0 | INDET | |
| 8 | 1 | 0 | 0 | 0 | 0 | 1 | 0 | 1 | 1 | 0 | 1 | 1 | 1 | 0 | 0 | 0 |
| 9 | 1 | 0 | 0 | 1 | 0 | 0 | 0 | 1 | 1 | 0 | 1 | 1 | 1 | 0 | 0 | 0 |
| | | | | | | | 1 | 0 | | 1 | 0 | | 0 | 0 | 0 | 1 |
| 10 | 1 | 0 | 1 | 0 | 0 | 0 | 0 | 1 | 1 | 0 | 1 | 1 | 1 | 0 | 0 | 0 |
| | | | | | | | 1 | 0 | | 1 | | 0 | 0 | 0 | 1 | 0 |
| 11 | 1 | 0 | 1 | 1 | 0 | 0 | 0 | 1 | 1 | 0 | 1 | 1 | 1 | 0 | 0 | 0 |
| | | | | | | | 1 | 0 | | 1 | 0 | 0 | 0 | 0 | INDET | |
| 12 | 1 | 1 | 0 | 0 | 0 | 1 | 0 | 1 | 1 | 1 | 1 | 1 | INDET | | 0 | 0 |
| 13 | 1 | 1 | 0 | 1 | 0 | 0 | 0 | 1 | 0 | 1 | 1 | 1 | INDET | | 0 | 0 |
| | | | | | | | 1 | 0 | 1 | 1 | 0 | | 0 | 0 | 0 | 1 |
| 14 | 1 | 1 | 1 | 0 | 0 | 0 | 0 | 1 | 0 | 0 | 1 | 1 | INDET | | 0 | 0 |
| | | | | | | | 1 | 0 | 1 | 1 | | 0 | 0 | 0 | 1 | 0 |
| 15 | 1 | 1 | 1 | 1 | 0 | 0 | 0 | 1 | 0 | 0 | 1 | 1 | INDET | | 0 | 0 |
| | | | | | | | 1 | 0 | 1 | 1 | 0 | 0 | 0 | 0 | INDET | |

Table V represents the operaton of the circuit of FIG. 4 in response to the presentation of four interrogation (request) signals having the different combinational binary states shown. The 16 possible combinational states of the three request signals have been designated as group numbers 0–15. For example, the presentation of the AR, BR, CR and DR signals as binary 0's is designated as group number 0.

The state of operation of the decision-making apparatus is determined by the combinational state of the pairs of signal sets into which the interrogation signals are organized by the apparatus of FIG. 4. One such set comprises the AR and BR signals and the other set comprises the CR and DR signals. If only one of these sets comprises a current request signal, the control tristate device 162 enables the corresponding one of the output tristate devices to deliver a binary 1 decision signal and forces the non-corresponding output tristate device to deliver a pair of binary 0 decision signals. On the other hand, if both of the interrogation signal sets comprise current request signals, the state of operation of the control tristate device 162 depends on its immediately preceding state of operation and, as a consequence, the one of the output tristate devices which is enabled to deliver a decision signal also depends on the immediately preceding state of operation of the $T_1$ device.

Group numbers 1, 2, 3, 4, 8 and 12 represent combinational states of the interrogation signals wherein only one of the signal sets comprises a current request signal and, therefore, the state of operation of the $T_1$ device for each of these group numbers is controlled solely by the combinational state of the interrogation signals. For example, in request group 1, the AR–BR interrogation set comprises the sole current request, represented by the binary 1 BR signal. In this instance, AND-gate 191 receives a pair of binary 1 signals from inverters 187 and 188 and, therefore, delivers a binary 1 $X_2$ signal. AND-gate 190 receives and is disabled by the inverted BR request signal received from inverter 186. Accordingly, the $T_1$ device, receiving the binary 1 $X_2$ signal and the binary 0 $X_1$ signal, operates in state-1, wherein the $Y_2$ signal is a binary 1 and the $Y_1$ signal is a binary 0. The consequent binary 1 output signal of inverter 199 controls OR-gates 195 and 196 to deliver respective binary 1 output signals. The $T_3$ tristate device, in response to this pair of binary 1 input signals operates in state-3, wherein both the CG and DG decision signals are binary 0's. OR-gate 194 now receives a pair of binary 0 signals and, therefore, delivers a binary 0 $Z_1$ signal. OR-gate 193 receives the binary 1 output signal of inverter 185 and, therefore, delivers a binary 1 $Z_2$ signal. The $T_2$ device, receiving the binary 1 $Z_2$ signal and the binary 0 $Z_1$ signal, operates in state-1, wherein the BG decision signal is a binary 1 and the AG decision signal is a binary 0.

In request group number 4, the CR–DR interrogation set comprises the sole current request, represented by the binary 1 CR signal. In this instance, AND-gate 190 receives a pair of binary 1 signals from inverters 185 and 186 and, therefore, delivers a binary 1 $X_1$ signal. AND-gate 191 receives and is disabled by the inverted CR request signal received from inverter 187. Accordingly, the $T_1$ device, receiving the binary 0 $X_2$ signal and the binary 1 $X_1$ signal, operates in state-2, wherein the $Y_2$ signal is a binary 0 and the $Y_1$ signal is a binary 1. The consequent binary 1 output signal of inverter 198 controls OR-gates 193 and 194 to deliver respective binary 1 output signals. The $T_2$ tristate device, in response to the pair of binary 1 input signals, operates in state-3, wherein both the AG and BG decision signals are binary 0's. OR-gate 195 now receives a pair of binary 0 signals and, therefore, delivers a binary 0 $Z_4$ signal. OR-gate 196 receives the binary 1 output signal of inverter 188 and, therefore, delivers a binary 1 $Z_3$ signal. The $T_3$ device, receiving the binary 0 $Z_4$ signal and the binary 1 $Z_3$ signal operates in state-2, wherein the CG decision signal is a binary 1 and the DG decision signal is a binary 0.

In request groups 3 and 12, the sole requesting interrogation set comprises a pair of current requests. In these instances, the particular request recognized is controlled partially by the immediately preceding state of operation of the output tristate device involved. For example, in request group 3, the AR–BR interrogation set comprises the sole current requests, both the AR and BR signals being binary 1's. As described previously, with respect to the operation of the apparatus of FIG. 4 for request group number 1, tristate device $T_1$ operates in state-1, wherein the consequent binary 1 output signal of inverter 199 control the CG and DG decision signals to be binary 0's, and wherein the output signal of inverter 198 is a binary 0. Both of OR-gates 193 and 194 now receive a pair of binary 0 signals and, therefore, deliver respective binary 0 output signals. The $T_2$ tristate device, in response to this pair of binary 0 signals, operates in a state which is determined by its immediately preceding history, as described previously with respect to Table III, delivering either a binary 1 AG or BG decision signal.

Group numbers 5, 6, 7, 9, 10, 11, 13, 14 and 15 represent combinational states of the interrogation signals wherein both of the signal sets comprise a current request signal and, therefore, the state of operation of the $T_1$ device for each of these group numbers is controlled partially by the combinational state of the request signals and partially by the immediately preceding state of operation of the $T_1$ device. In each of these interrogation signal groups, both of AND-gates 190 and 191 are disabled by the inverted binary 1 request signal received from one of the corresponding inverters. This pair of disabled AND-gates delivers binary 0 $X_1$ and $X_2$ signals. The $T_1$ tristate device, in response to this pair of binary 0 signals, operates in a state which is determined by its immediately preceding history. Consequently, whenever the combinational state of the interrogation signals provides a current request in each of the two sets into which the interrogation signals are organized, the $T_1$ device selects one of the interrogation signal sets in accordance with its immediately preceding history of operation.

For example, in request group 5, the AR-BR interrogation set comprises the current BR request and the CR-DR interrogation set comprises the current CR request. If tristate device $T_1$ now assumes operation in state-1, the consequent binary 1 output signal of inverter 199 controls the CG and DG decision signals to the binary 0's and the binary 0 output signal of inverter 198 enables the $T_2$ tristate device to recognize one of the signals of the AR-BR interrogation set. OR-gate 193 receives the binary 1 $\overline{AR}$ signal and delivers a binary 1 $Z_2$ signal. OR-gate 194 receives the binary 0 $\overline{BR}$ signal and delivers a binary 0 $Z_1$ signal. The $T_2$ tristate device is thereby controlled to operate in state-1 and to deliver a binary 1 BG signal and a binary 0 AG signal. Accordingly, the BR interrogation signal is recognized. However, if tristate device $T_1$ assumes operation in state-2, the consequent binary 1 output signal of inverter 198 controls the AG and BG decision signals to be binary 0's and the binary 0 output signal of inverter 199 enables the $T_3$ tristate device to recognize the CR signal of the CR–DR interrogation set.

In request groups 7, 11, 13, 14, and 15, at least one of the two requesting interrogation sets comprises a pair of current requests. In these instances, not only does the control tristate device select one of the interrogation sets in accordance with its immediately preceding history of operation, but if the selected set comprises a pair of current requests, the corresponding output tristate device is governed by its past history in selecting a particular interrogation signal for recognition. For example, in request group 7, if tristate device $T_1$, governed by its past history, assumes operation in state-1, the $T_2$ tristate device is enabled to recognize one of the signals of the AR–BR interrogation set. Since both the AR and BR request signals are binary 1's, both of OR-gates 193 and 194 receive a pair of binary 0 input signals and the respective $Z_2$ and $Z_1$ signals are binary 0's. The $T_2$ device, upon receiving the pair of binary 0 signals, operates in state-1 or state-2 according to its immediately preceding history, whereupon one of the AG or BG decision signals is a binary 1.

The general form of the embodiment of FIG. 4 comprises an output tristate device for each pair of interrogation signals and additional control tristate devices for providing selection among pairs of groups of the interrogation signals. The output signals delivered by the control tristate devices are employed to inhibit generation of output decision signals for the non-selected one of the corresponding interrogation group pair. The sole decision signal delivered represents the granting of the request of one of the interrogation signals of the interrogation group selected by the control tristate devices.

As described previously herein, for N interrogation signals, $N-1$ tristate devices are employed to select one interrogation signal. In the general form of the embodiment of FIG. 4, if N is an even number, $N/2$ of the $N-1$ tristate devices are output devices, whereas if N is an odd number $(N/2-\frac{1}{2})$ are output devices.

From the principles of the invention set forth herein certain other embodiments have been made apparent. For example, the $N-1$ tristate devices may be organized into other combinations to select one of N interrogation signals. Thus, one of the tristate devices may provide a pair of decision signals and each of the remaining devices may utilize one output signal as a decision signal and the other output signal for providing selection among pairs of groups of the interrogation signals. The apparatus of FIG. 3 is one form of such an embodiment.

Accordingly, there has been described herein a novel and improved decision-making apparatus for continuously sensing all of a plurality of interrogation signals, for selecting one, and only one, of the interrogation signals if one or more of the interrogation signals represent current requests, and for delivering a decision signal identifying the selected interrogation signals.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. Apparatus for selecting one of a plurality of signals comprising means for supplying a plurality of request signals, a plurality of tristate devices, each of said devices being adapted to receive first and second input signals at a pair of input terminals and to deliver first and second output signals at a pair of output terminals, each of said devices operating in a first state to deliver said first output signal, operating in a second state to deliver said second output signal, and operating in a third state to deliver neither of said output signals, each of said devices being inhibited from at any time simultaneously delivering both of said output signals, each of said devices responding to said first input signal to operate in said first state, responding to said second input signal to operate in said second state, responding to both of said input signals to operate in said third state, and responding to the absence of said input signals to operate in one of said first or second states; and coupling means for coupling each of said request signals to a respective one of said input terminals of said tristate devices.

2. The apparatus of claim 1 wherein each of said tristate devices responds to the absence of both of said input signals to continue operating in said first state if said device was operating in said first state immediately prior to the disappearance of both of said input signals; to continue operating in said second state if said device was opearting in said second state immediately prior to said disappearance; and to randomly operate in one of said first or second states if said device was operating in said third state immediately prior to said disappearance.

3. The apparatus of claim 1 further including means responsive to one output signal of at least one of said tristate devices for controlling one portion of said output signals of said tristate devices and means responsive to the other output signal of said one tristate device for controlling another portion of said output signals.

4. The apparatus of claim 1 further including means responsive to one portion of said request signals for controlling one input signal of one of said tristate devices, means responsive to another portion of said request signals for controlling the other input signal of said one tristate device, means responsive to one output signal of said one tristate device for controlling one portion of said output signals of said tristate devices and means responsive to the other output signal of said one tristate device for controlling another portion of said output signals.

5. Multiple request resolving apparatus comprising means for supplying a plurality of request binary signals, each of said request signals having either one of first and second levels, one of said levels representing a communication request; a plurality of tristate devices, each of said devices being adapted to receive a pair of input binary signals at a pair of input terminals and to deliver a pair of request-granting output binary signals at a pair of output terminals, each of said input binary signals having either one of first and second levels and each of said output binary signals having either one of first and second values, each of said devices operating in a first state by delivering a first of said output signals with said first value and a second of said output signals with said second value, operating in a second state by delivering said first output signal with said second value and said second output signal with said first value, and operating in a third state by delivering both of said output signals with said first value, each of said devices being inhibited from at any time simultaneously delivering both of said output signals with said second value, each of said devices responding to a first of said input signals having said first level and a second of said input signals having said second level to operate in said first state, responding to said first input signal having said second level and said second input signal having said first level to operate in said second state, responding to both of said input signals having said first level to operate in said third state, and responding to both of said input signals having said second level to operate in one of said first or second states; and coupling means for coupling pairs of said request signals to said input terminals of respective ones of said tristate devices.

6. The apparatus of claim 5 wherein said coupling means is adapted to receive and logically invert said request signals and to deliver an inversion signal for each of said request signals, each of said inversion signals having said first level when the corresponding request signal has said second level and having said second level when the corresponding request signal has said first level, said coupling means further applying pairs of said inversion signals to said input terminals of respective ones of said tristate device.

7. The apparatus of claim 1 further including means for coupling one portion of said plurality of request signals to one input terminal of one of said tristate devices and for coupling the remaining portion of said plurality of request signals to the other input terminal of said one tristate device, and inhibiting means controlled by the output signals of said one tristate device for preventing others of said tristate devices from responding to request signals coupled thereto.

8. The apparatus of claim 7 wherein said inhibiting means controls said other tristate devices to operate in said third state.

9. The apparatus of claim 8 wherein each of said tristate devices responds to the absence of said input signals to continue operating in said first state if said device was operating in said first state immediately prior to the disappearance of both of said input signals; to continue operating in said second state if said device was operating in said second state immediately prior to said disappearance; and to randomly operate in one of said first or second states if said device was operating in said third state immediately prior to said disappearance.

10. The apparatus of claim 5 further including means for coupling one portion of said plurality of request signals to one input terminal of one of said tristate devices and for coupling the remaining portion of said plurality of request signals to the other input terminal of said one tristate device, and inhibiting means controlled by the output signals of said one tristate device for controlling others of said tristate devices to operate in said third state.

11. Multiple request resolving apparatus comprising: means for supplying four request signals; three tristate devices, two of said devices being output tristate devices and one being a control device, each of said devices being adapted to receive first and second input signals at a pair of input terminals and to deliver first and second output signals at a pair of output terminals, each of said devices operating in a first state to deliver said first output signal, operating in a second state to deliver said second output signal, and operating in a third state to deliver neither of said output signals, each of said devices being inhibited from at any time simultaneously delivering both of said output signals, each of said devices responding to said first input signal to operate in said first state, responding to said second input signal to operate in said second state, responding to both of said input signals to operate in said third state, and responding to the absence of said input signals to operate in one of said first or second states; four OR-gates, each OR-gate having two input terminals and one output terminal, the output terminal of each OR-gate being connected respectively to one input terminal of each of the output tristate devices; two AND-gates, each AND-gate having two input terminals and an output terminal, the output terminal of each AND-gate being connected respectively to an input terminal of the control tristate device; six inverters, each of four of said inverters having applied to it respectively a request signal from said means supplying request signals, the output of each of said four inverters being connected respectively to an input terminal of an OR-gate and to an input terminal of an AND-gate, the other pair of inverters being connected respectively to the output terminals of the control tristate device with the outputs of the inverters respectively connected to the other input terminals of the pair of OR-gates connected to each output tristate device.

References Cited

UNITED STATES PATENTS

| | | | |
|---|---|---|---|
| 2,935,627 | 5/1960 | Schneider | 307—88.5 |
| 3,046,415 | 7/1962 | Winslow | 307—88.5 |
| 3,167,662 | 1/1965 | Crain | 307—88.5 |
| 3,222,647 | 12/1965 | Strachey | 340—172.5 |
| 3,268,743 | 8/1966 | Nourney | 307—88.5 |
| 3,310,784 | 3/1967 | Hilinski | 340—172.5 |

ROBERT C. BAILEY, Primary Examiner

R. M. RICKERT, Assistant Examiner